(12) United States Patent
Fromer

(10) Patent No.: US 11,124,101 B2
(45) Date of Patent: Sep. 21, 2021

(54) SAFE LANDING HEADREST

(71) Applicant: Eric B. Fromer, Los Angeles, CA (US)

(72) Inventor: Eric B. Fromer, Los Angeles, CA (US)

( * ) Notice: Subject to any disclaimer, the term of this patent is extended or adjusted under 35 U.S.C. 154(b) by 0 days.

(21) Appl. No.: 16/355,485

(22) Filed: Mar. 15, 2019

(65) Prior Publication Data

US 2020/0290492 A1     Sep. 17, 2020

(51) Int. Cl.
*B60N 2/888* (2018.01)
*B60N 2/853* (2018.01)
*B60N 2/90* (2018.01)

(52) U.S. Cl.
CPC ............. *B60N 2/888* (2018.02); *B60N 2/853* (2018.02); *B60N 2/90* (2018.02)

(58) Field of Classification Search
CPC ........ B60N 2/838; B60N 2/841; B60N 2/844; B60N 2/847; B60N 2/853; B60N 2/80; B60N 2/888
See application file for complete search history.

(56) References Cited

U.S. PATENT DOCUMENTS

| | | | |
|---|---|---|---|
| D114,973 S | 5/1939 | Eckman | |
| D164,759 S | 10/1951 | Bartolucci | |
| 3,366,417 A | 1/1968 | Belk | |
| 3,555,582 A | 1/1971 | Radford | |
| 3,899,208 A | 8/1975 | Cirigliano | |
| 4,114,948 A | 9/1978 | Perkey | |
| D251,168 S | 2/1979 | Perkey | |
| D254,029 S | 1/1980 | Barbagallo | |
| 4,304,439 A * | 12/1981 | Terada | A47C 7/38 297/409 |
| 4,744,601 A * | 5/1988 | Nakanishi | B60N 2/80 297/391 |
| 4,807,927 A | 2/1989 | Livick | |
| 5,181,763 A * | 1/1993 | Dellanno | B60N 2/809 297/391 |
| D343,001 S | 1/1994 | Boland | |
| 5,432,967 A | 7/1995 | Raftery | |

(Continued)

FOREIGN PATENT DOCUMENTS

| | | | | |
|---|---|---|---|---|
| DE | 2246771 A1 * | 4/1973 | ............... | A47C 7/38 |
| DE | 10319453 B3 * | 6/2004 | ............. | B60N 2/888 |

(Continued)

OTHER PUBLICATIONS

Notice of Allowance dated Mar. 18, 2020, for U.S. Appl. No. 29/685,146, filed Mar. 26, 2019, five pages.

*Primary Examiner* — Timothy J Brindley
(74) *Attorney, Agent, or Firm* — Morrison & Foerster LLP

(57) ABSTRACT

A headrest apparatus in accordance with this disclosure supports the head and cervical spine during driving and driving events. The headrest apparatus including a headrest, one or more rods extending from the headrest, and a rotation mechanism located in the headrest coupled between the headrest and the plurality of rods. The headrest may include at least a front face, a rear face opposite the front face, a bottom face located between a lower portion of the front face and a lower portion of the rear face, and two side faces located opposite each other between the front face and the rear face. In a first position a profile of the front face may conform to a normal cervical spine curvature of an occupant in a seated position.

13 Claims, 9 Drawing Sheets

(56) References Cited

U.S. PATENT DOCUMENTS

| | | |
|---|---|---|
| 5,669,666 A | 9/1997 | Lee |
| D406,718 S | 3/1999 | Jacobs |
| D409,023 S | 5/1999 | Keilhauer |
| 6,360,387 B1 | 3/2002 | Everhart |
| 6,695,373 B1 | 2/2004 | Meise |
| D531,315 S | 10/2006 | Caudra |
| D728,270 S | 5/2015 | Hauer |
| D750,929 S | 3/2016 | Line |
| D759,415 S | 6/2016 | Smith |
| D760,526 S | 7/2016 | Smith |
| D798,094 S | 9/2017 | Albert |
| 9,862,294 B2 * | 1/2018 | Yamane ............... B60N 2/841 |
| D833,774 S | 11/2018 | Mittelstadt |
| 10,166,899 B1 * | 1/2019 | Jiang .................. B60N 2/847 |
| D845,035 S | 4/2019 | Raad |
| D865,392 S | 11/2019 | Phillips |
| D874,851 S | 2/2020 | Mittelstadt |
| D883,001 S | 5/2020 | Fromer |
| 2004/0245834 A1 * | 12/2004 | Schmitt ................ B60N 2/305 297/408 |
| 2008/0315657 A1 * | 12/2008 | Beroth ................. B60N 2/821 297/391 |
| 2009/0085393 A1 | 4/2009 | Austen |
| 2009/0152846 A1 | 6/2009 | Choi |
| 2010/0225094 A1 | 9/2010 | Rose |
| 2011/0084534 A1 * | 4/2011 | Sohn ................... B60N 2/859 297/408 |
| 2011/0204686 A1 * | 8/2011 | Lee ..................... B60N 2/838 297/216.12 |
| 2014/0210245 A1 * | 7/2014 | Tobata ................ B60N 2/844 297/408 |
| 2017/0079438 A1 * | 3/2017 | Speicher .............. A47C 1/036 |
| 2017/0320418 A1 * | 11/2017 | Madrigal .............. B60N 2/80 |
| 2018/0140101 A1 | 5/2018 | Davis |
| 2019/0061585 A1 * | 2/2019 | Nakamura ........... B60N 2/853 |
| 2019/0184878 A1 * | 6/2019 | Milner ................. B60N 2/853 |
| 2019/0359105 A1 * | 11/2019 | Kondo ................. B60N 2/818 |
| 2020/0196765 A1 * | 6/2020 | Texeraud ............. B60N 2/64 |

FOREIGN PATENT DOCUMENTS

| | | | | |
|---|---|---|---|---|
| DE | 102010024180 A1 * | 2/2011 | | B60N 2/856 |
| DE | 102018104072 A1 * | 8/2019 | | B60N 2/815 |
| EP | 0976608 A1 * | 2/2000 | | B60N 2/838 |
| FR | 2832365 A1 * | 5/2003 | | B60N 2/85 |
| WO | WO-03057526 A1 * | 7/2003 | | B60N 2/844 |
| WO | WO-2004108472 A1 * | 12/2004 | | B60N 2/888 |
| WO | WO-2012086747 A1 * | 6/2012 | | B60N 2/844 |
| WO | WO-2016049691 A1 * | 4/2016 | | B60N 2/643 |
| WO | WO-2017173400 A1 * | 10/2017 | | B60N 2/4214 |

* cited by examiner

SAFE LANDING HEADREST

FIELD OF THE DISCLOSURE

This relates generally to a system and method for supporting the head and cervical spine while in a vehicle or other structure where sudden, violent and unexpected impacts may occur.

BACKGROUND OF THE DISCLOSURE

During routine operation of a vehicle, a traditional seat may include a seat having a backrest, and a headrest. The traditional seat is configured such that an occupant of the vehicle may be seated on the seat and leaning against the backrest, with the head erect in front of the headrest. In this configuration, the head of the occupant is not in direct contact with the headrest during normal operation of the vehicle. In some configurations, the distal portion of the occipital region of the head may lightly contact the headrest. As a result, the traditional headrest provides little to no head or neck support for the occupant during normal operation of the vehicle.

Typically, the traditional headrest acts a backstop when a driving event occurs. That is, with the occurrence of a driving event, the head of the occupant may move, for example, from the erect position backward, until the head hits the traditional headrest and the head comes to a sudden stop. A driving event may include a rear-end collision, driving over a pot hole or bump in the road, and the like. Depending on the severity and force involved in the driving event, such as a rear-end collision, the occupant may suffer neck and spine damage (e.g., "whiplash"), due to a shearing motion of the discs of the spine, or brain injuries due to the impact of the head against the headrest.

BRIEF SUMMARY OF THE DISCLOSURE

The disclosure relates to a headrest for supporting the head and cervical spine during driving and driving events. A headrest apparatus according to examples of the disclosure can include a headrest, one or more rods extending from the headrest and a rotation mechanism located in the headrest and coupled between the headrest and the plurality of rods. The headrest may include at least a front face, such that in a first position a profile of the front face conforms to a normal cervical spine curvature of an occupant in a seated position. The headrest may also include a rear face opposite the front face and a bottom face located between a lower portion of the front face and a lower portion of the rear face. The headrest may include at least two side faces located between the forward-facing surface and the rear facing surface, such that the first and second side faces are opposite each other. The one or more rods may extend from the bottom face of the headrest.

The rotation mechanism can be configured to rotate the headrest from a first position to at least a second position when the headrest receives at least a first force for at least a first duration. The rotation mechanism may remain in the second position once the first force is removed. In some embodiments, the rotation mechanism may be a piston mechanism, a curvilinear track mechanism, or a link and track mechanism or another rotation mechanism known in the art.

The headrest may include a first button located on the first side surface. In some examples, the first button is configured to rotate the headrest from at least the second position to the first position. The headrest may rotate around an axis of rotation. The axis of rotation of the rotation mechanism of the headrest may be located in a direction forward and below a center of mass of the headrest. In some embodiments, the axis of rotation of the rotation mechanism can be located at a location outside the headrest. In some embodiments, the rotation mechanism can be configured to rotate the headrest from the second position to a third position when the headrest receives at least a second force for at least a second duration. In some embodiments, the second force is greater than the first force. In other embodiments, the rotation mechanism can be configured to rotate the headrest from the first position through the second position to the third position when the headrest receives at least the first force for at least a third duration, wherein the third duration is longer than the first duration. According to some embodiments, the headrest apparatus is configurable to be held in a plurality of positions depending on a force received at the headrest, wherein each of the plurality of positions is positioned at a different angle of rotation.

The headrest according some embodiments is configured to have the front face contact a neck and a head of the occupant in the first position. In some embodiments the headrest apparatus may include a layer of cooling gel disposed beneath a surface of the headrest underneath the front face. In some embodiments, the headrest may include a plurality of perforations disposed on a surface of the front face of the headrest. According to some embodiments, the headrest apparatus is configured to be used with a car seat. According to some embodiments, a distal bottom portion of the headrest is disposed below and in front of a top surface of the car seat in a first position.

This disclosure also relates to a method for protecting an occupant of the vehicle. The method may include rotating a headrest from a first position corresponding to a cervical spine curvature of the occupant in a seated position to a second position when at least a first force is applied by the occupant to the headrest for at least a first duration. During the rotation of the headrest from the first position to the second position, the headrest may maintain conformity with the cervical spine curvature of the occupant. In some embodiments, energy from the first force is dissipated during the rotation of the headrest from the first position to the second position.

According to some embodiments, the headrest may include contact between a neck and a back of a head of the occupant with the headrest in the first position prior to the application of the first force. In some embodiments, the headrest can stay in the second position once the first force is removed. The headrest may rotate from the second position to a third position when at least a second force is applied by the occupant to the headrest for at least a second duration. In some embodiments, the second force is greater than the first force.

In some embodiments, pressing at least one button disposed on a side face of headrest releases the rotation mechanism to rotate the headrest from the second position to a fourth position, anterior to the second position. According to some embodiments, the fourth position and the first position are same. According to some embodiments, the fourth position and the second position are the same. According to some embodiments, the fourth position may be a position anterior to the first position.

DETAILED DESCRIPTION OF THE INVENTION

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

Figure 1:
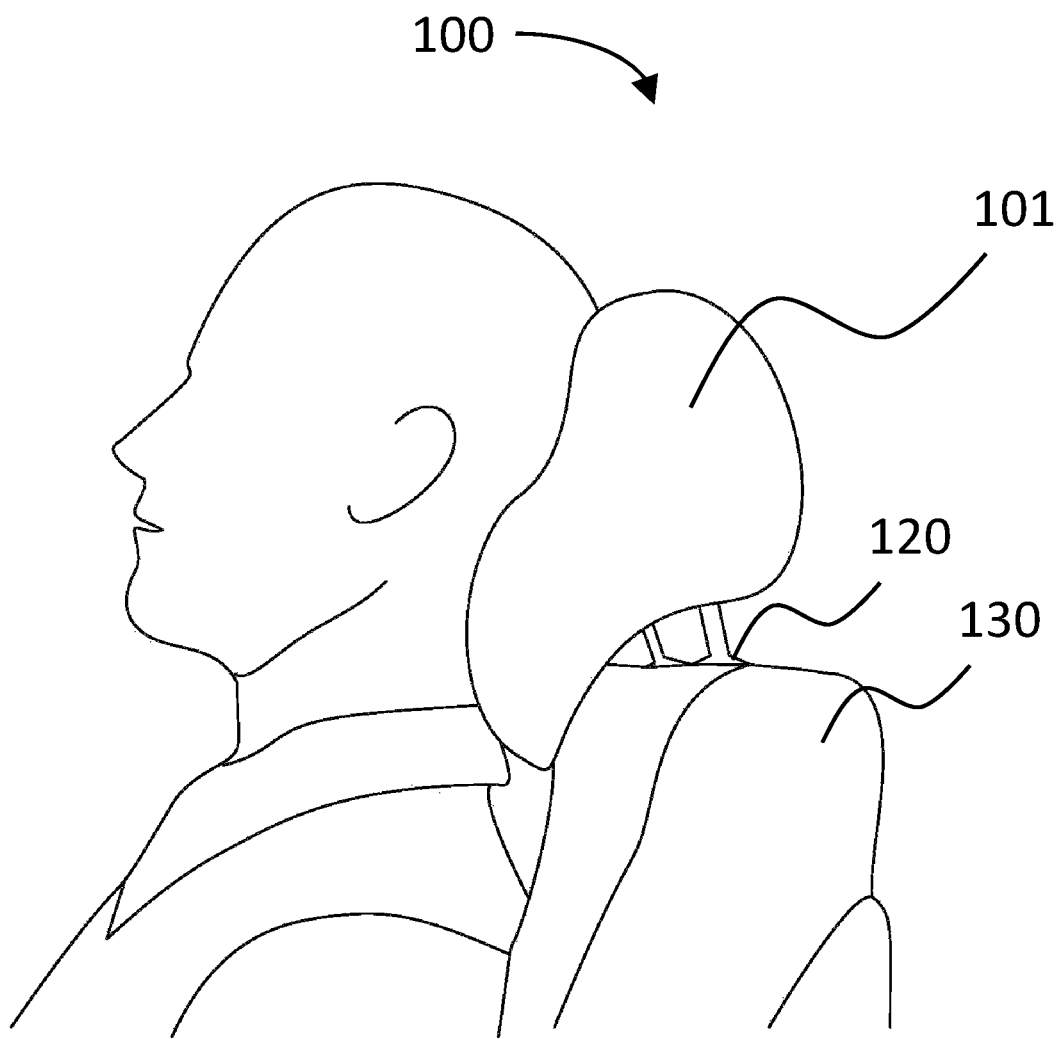
FIG. 1 is a perspective view of a headrest apparatus according to embodiments of the present disclosure.

FIG. 1 shows an occupant in a seat 130 with a headrest apparatus 100 according to embodiments of the present disclosure. The headrest apparatus 100 includes headrest 101, rotation mechanism (not shown) and a plurality of rods 120. The headrest 101 is shown in a neutral position. The neutral position of the headrest 101 can be configured to conform to the curvature of the cervical portion of a normal spine in a seated position. That is, the front facing profile of the headrest 101 approximately conforms to the normal curvature of the spine. The curvature of the profile of the headrest 101 in the neutral position enables the headrest to support the back of the neck and the back of the head of an occupant while seated in seat 130. Supporting the neck and head while an occupant is seated during routine driving may help alleviate neck, back, and shoulder strain associated with driving as the muscles in these areas no longer need to support the full weight of the head.

Figure 2A:
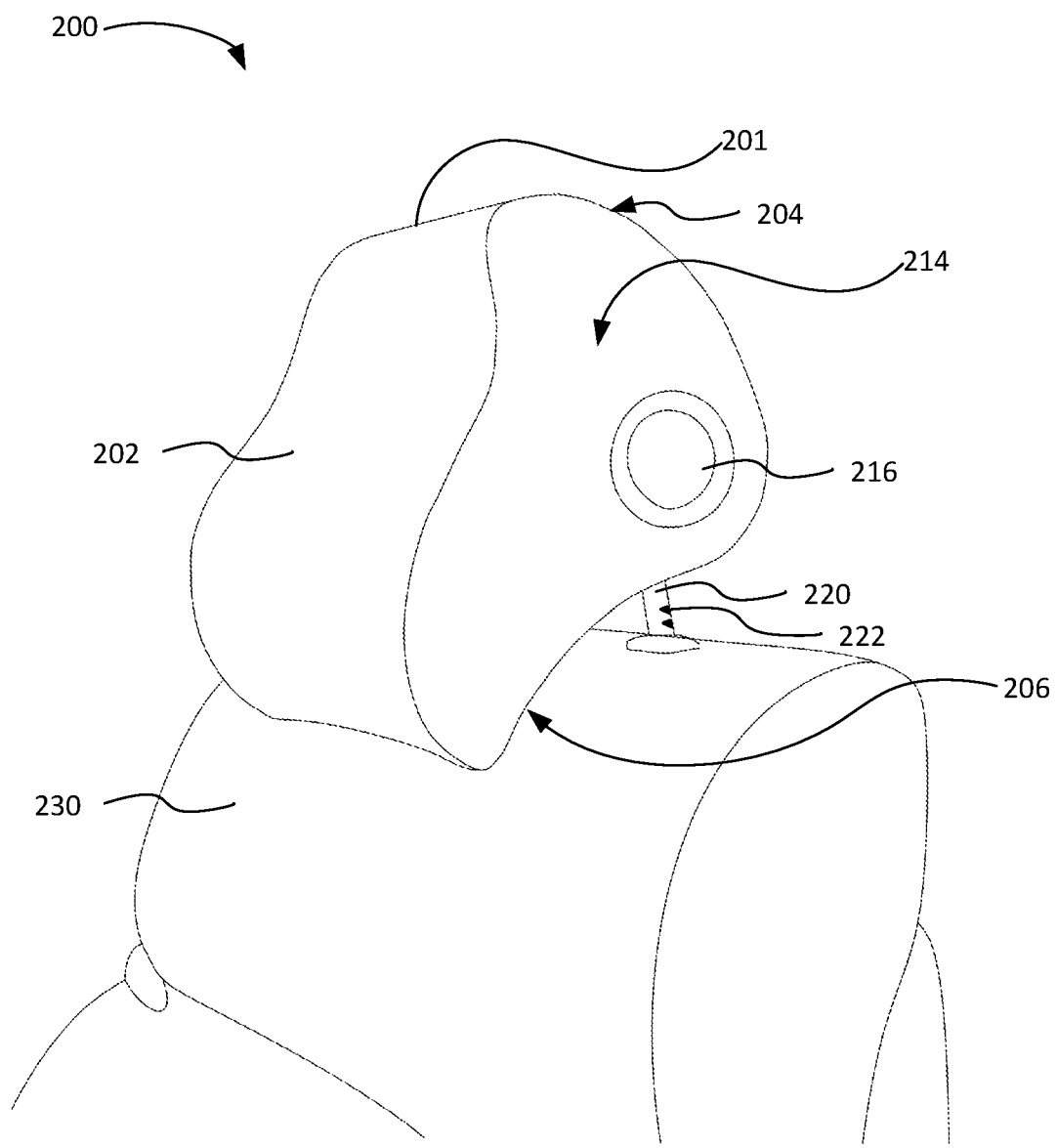
FIGS. 2A-2B are perspective views of a headrest apparatus according to embodiments of the present disclosure.

FIG. 2A illustrates a vehicle seat 230 with a headrest apparatus 200 according to embodiments of the present disclosure. The apparatus 200 includes at least a headrest 201 and one or more rods 220. In some embodiments, the one or more rods 220 may be a pair of rods. The apparatus may also include rotation mechanism (not shown) located in the headrest 201 and coupled between the headrest 201 and the pair of rods 220. The headrest 201 is rotatable between a plurality of positions. In some embodiments, the apparatus 200 includes a button 216 disposed on a side surface 214 of the headrest 201.

In some embodiments, the headrest 201 may include a front face 202, a rear face 204 located opposite the front face and a bottom face 206 disposed between the lower portions of the front face 202 and the rear face 204. The headrest 201 may include a first side face 214 located between the front face 202 and rear face 204. A second side face (not shown) may be located opposite the first side face 214 between the front face 202 and rear face 204. As shown in FIG. 2, a distal portion of the headrest 201, e.g., near where the lower portion of the front face 202 and the bottom face 206 meet, may be located at least partially below and in front of the seat 230. In some embodiments, the distal portion of the headrest 201 may be located either partially below or partially in front of the seat 230.

Figure 6B:
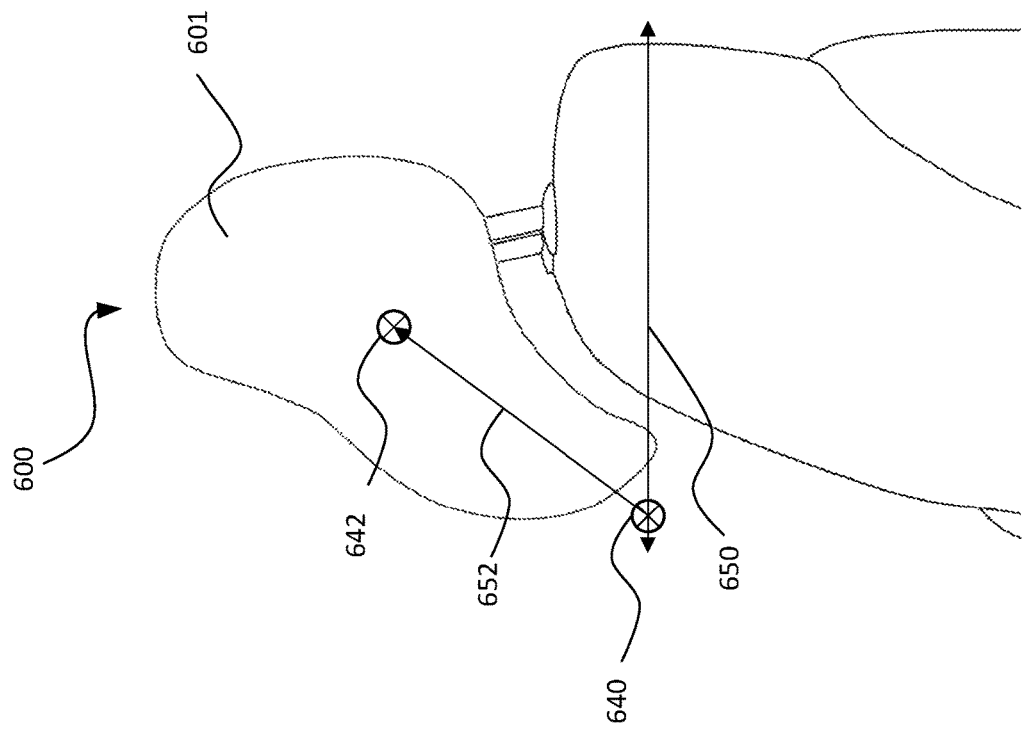
FIGS. 6A-6D illustrate a headrest apparatus in various positions according to embodiments of the present disclosure.

The headrest may include button 216 located on side surface 214. Button 216 is operatively connected to the rotation mechanism (not shown) such that pressing button 216 may release the rotation mechanism, thereby allowing the headrest to move to a relatively anterior position. For example, if the headrest is in a first position (e.g., FIG. 6B), pressing the button 216 may allow the headrest to rotate counterclockwise to an anterior position, (e.g., FIG. 6A). Rotation of the headrest apparatus 200 and various positions will be described in greater detail below.

In some embodiments, there may be a second button (not shown) disposed on a second side surface (not shown). In some embodiments, depressing both buttons may release the rotation mechanism. In some embodiments, pressing one of the two buttons may be sufficient to release the rotation mechanism. One skilled in the art will understand that the placement, shape, and number of buttons is not intended to limit the scope of the present disclosure.

The headrest apparatus 200 may include one or more rods 220 extending from the bottom face of the headrest 201. According to some embodiments, the one or more rods 220 may be configured to mate with a seat 230 of a vehicle. In some embodiments, the headrest apparatus 200 and the one or more rods may be designed for use with a standard car seat. For example, the plurality of rods may include indentations 222 to mate with typical/standard industry car seats. In this manner, most cars may be retro-fitted with an apparatus in accordance with embodiments of the present disclosure.

In some embodiments, the headrest apparatus may be designed to be used with a vehicle seat specifically designed for the headrest. Although the apparatus is illustrated as mating with a seat for a car, one skilled in the art will understand that the headrest could be mated with a number of vehicle seats, not limited to cars. For example, in some embodiments, the apparatus may be configured to be used in trucks, buses, trains, planes, and the like. According to some embodiments an alternate coupling feature may be used in place of the plurality of rods.

Figure 2B:
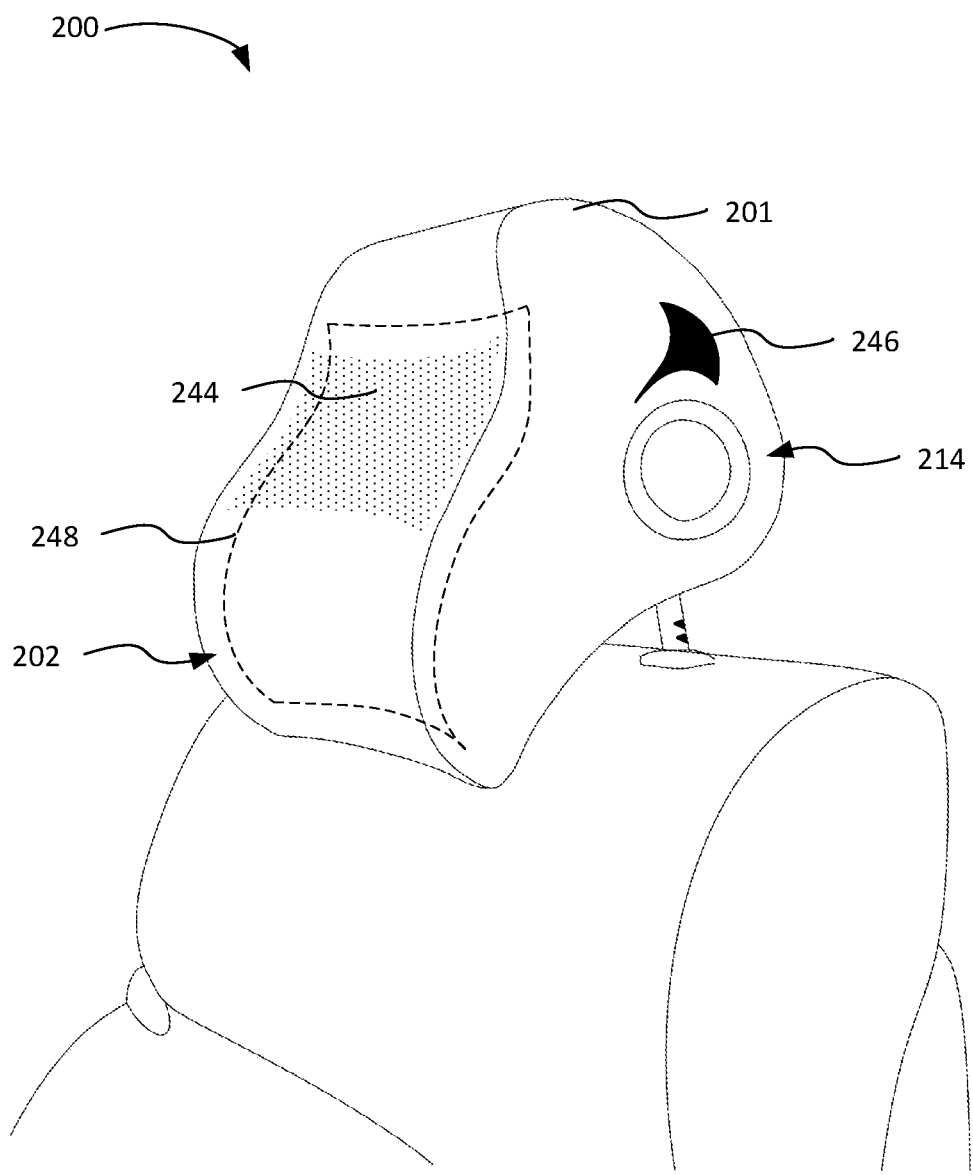

A headrest apparatus in accordance with embodiments of the present disclosure is designed to provide continuous contact and support with the back of the neck of a user. Due to the prolonged contact, the headrest may retain heat and/or the contact regions of back of the neck and head of the occupant may get sweaty. To keep the headrest cool, embodiments of the present disclosure may include a cooling feature. Referring to FIG. 2B, in some embodiments, the headrest 201 may include a layer of cooling gel 248 beneath the surface of the front face 202. The cooling gel may be arranged to draw heat from the occupant to keep the contact region cool. In some embodiments, the layer of cooling gel may be one continuous layer. In some embodiments, the cooling gel may be located in contact regions.

According to embodiments of this disclosure, the headrest 201 may include perforations 244 or small holes on the front face 202 to allow the heat to escape between the headrest 201 into the environment. The perforations 244 may be located in regions of the front face that will be in contact with an occupant. In some embodiments, the perforations may cover substantially the entire front face 202. In some embodiments, the headrest 201 may include vents 246 located on the side faces, e.g., side face 214, or bottom face of the headrest to allow heat to escape. In some embodiments, only a single cooling feature may be used. In some embodiments, a combination of cooling features may be used.

Figure 3A:
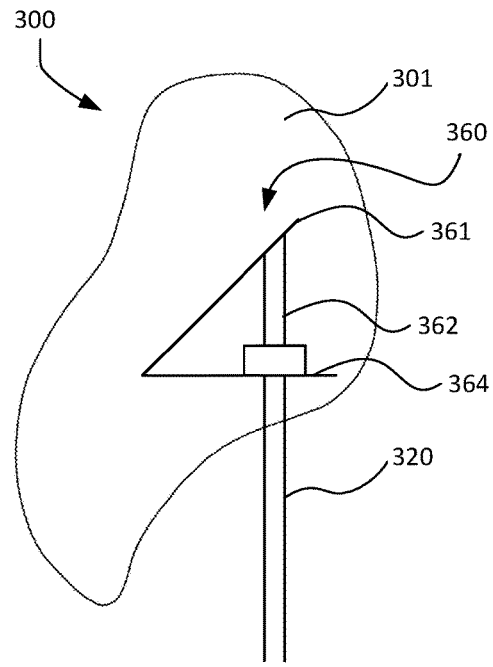
FIGS. 3A-3D illustrate a rotation mechanism of a headrest apparatus according to embodiments of the present disclosure.

FIG. 3A is a side view of an apparatus 300 with a rotation mechanism 360 in accordance with embodiments of the present disclosure. The rotation mechanism 360 can be coupled between the headrest 301 and the one or more rods 320. The rotation mechanism 360 may enable the headrest 301 to move between a first position (e.g., FIG. 3A) to at least a second position (e.g., FIG. 3B). One skilled in the art will understand that various rotation mechanisms may be used without departing from the scope of the present disclosure. The rotation mechanisms disclosed herein are provided as example and are not intended to limit the scope of the present disclosure.

Figure 3B:
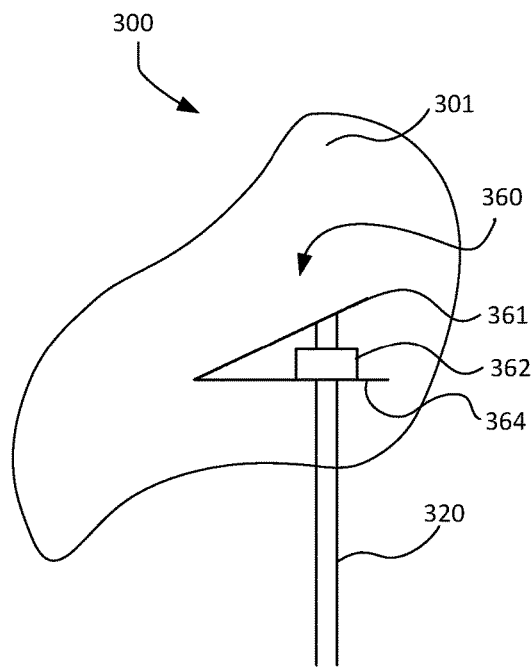

Referring to FIGS. 3A-3D, the rotation mechanism 360 can be a piston or plunger 362. The piston 362 is configured to move between discrete locations in a vertical direction. For example, the piston 362 may be configured to move between five discrete positions depending on the amount of force exerted on the headrest 301 and the duration of that force. That is, when a first force is exerted on the headrest 301 for a certain amount of time, the piston 362 may move downward between a first position and second position, e.g., between FIGS. 3A and 3B. FIGS. 3A and 3B are provided as examples and may not be to scale. In some embodiments, when at least a second force is exerted on the headrest 301 for at least a second duration, the piston 362 may move from a second to a third position. The piston 362 may be a hydraulic or pneumatic piston or any piston known in the art.

Figure 3C:
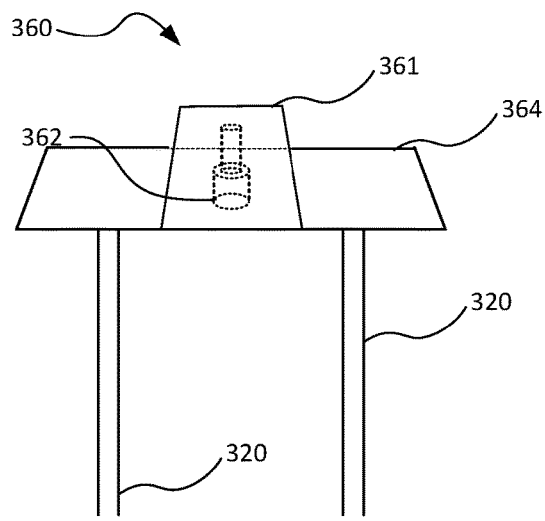
Figure 3D:
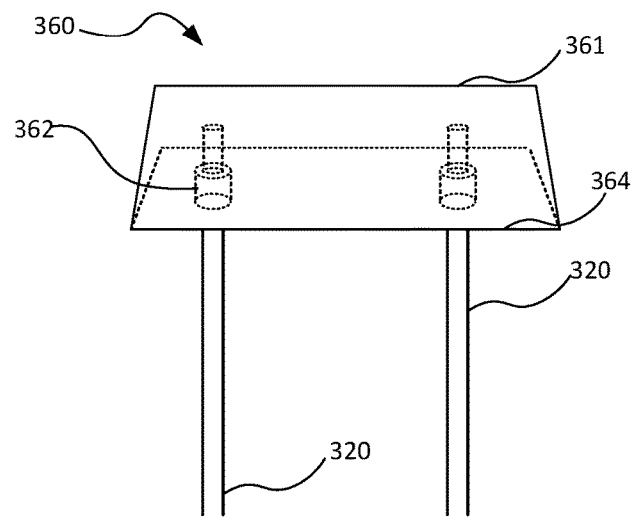

A top of the piston 362 may be coupled to a hinge 361. The hinge 361 may be coupled to the headrest 301 such that movement of the piston 362 causes the hinge 361 to rotate the headrest 301. The hinge 361 may be attached to a frame of the headrest 301 or otherwise secured relative to headrest 301. A bottom of the piston 362 may be coupled to the plurality of rods 320 at coupling block 364. Referring to FIG. 3C, in some embodiments, a single piston 362 may be coupled to the coupling block 364 between a plurality of rods 320. Referring to FIG. 3D, in some embodiments, more than one piston 362 may be coupled to coupling block 364. Additional pistons may help to evenly distribute the load of the force acting on the headrest 301.

Figure 4:
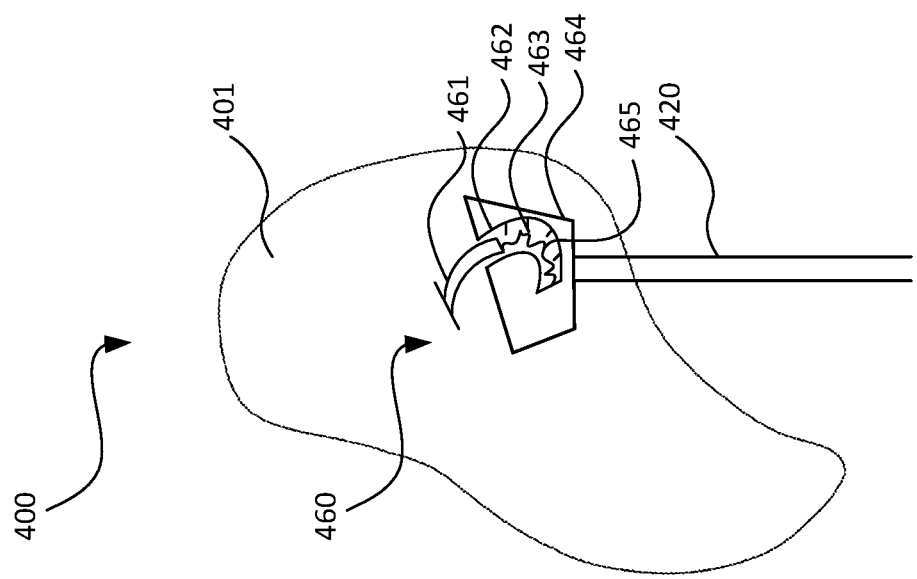
FIG. 4 is a headrest apparatus according to embodiments of the present disclosure.

FIG. 4 illustrates cross-sectional views of a headrest apparatus 400 with a rotation mechanism 460 according to embodiments of the present disclosure. The rotation mechanism 460 may be a curvilinear track. Specifically, the headrest 401 may be coupled to a curved protrusion 461. The curved protrusion 461 may be attached to a frame of the headrest 401 or otherwise secured relative to headrest 401. The curved protrusion 461 can be configured to mate with a curved track 462. The curved track 462 may be located in a coupling block 464 attached to a top of at least one of the plurality of rods 420.

As described above with respect to FIGS. 3C and 3D, in some embodiments, a single coupling block 464 of the curvilinear track 460 may be coupled to the plurality of rods 420. A single curvilinear track 462 may be located in the coupling block 464. In this embodiment, the headrest 401 may include a single curved protrusion 461 to mate with the single curvilinear track 462. In some embodiments, there may be more than one curvilinear track 462 located in the coupling block 464. Accordingly, the headrest 401 may include more than one curved protrusion 461 to mate with each of the more than one curvilinear tracks 462.

The curvilinear track 462 may include a plurality of pawls 463. In some embodiments, there may be a pair of pawls instead of a single pawl. Each pawl 463 corresponds to a position of the headrest 401. For example, the topmost pawl may correspond to a first position of the headrest 401. In some embodiments, the curvilinear track 462 can include a spring 465. The spring 465 can moderate the amount of force required to move the curved protrusion 461 down the curvilinear track 462 to a more posterior position. The spring 465 also allows the curved protrusion 461 to ascend the curvilinear track 462 and return the headrest 401 to a more anterior position when the pawls 463 of the curvilinear track rotation mechanism 460 are released.

Figure 5:
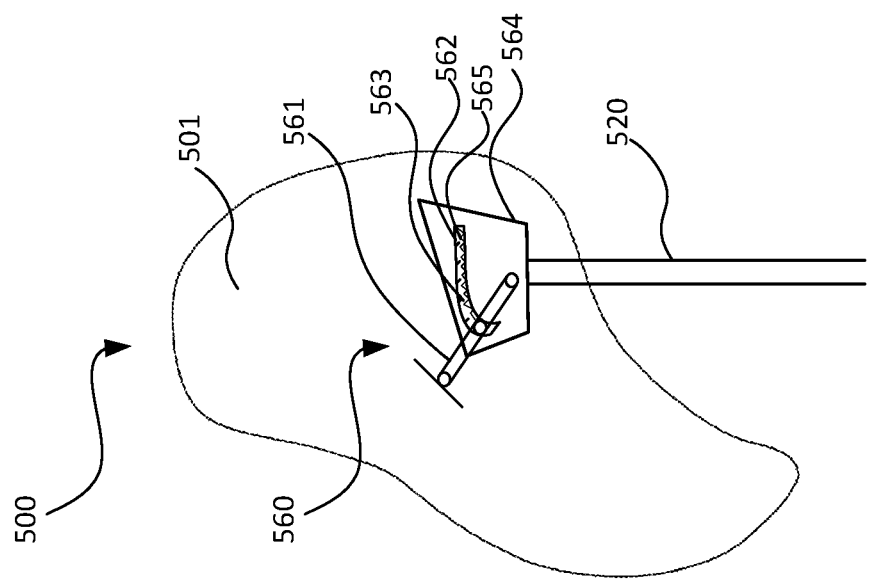
FIG. 5 is a headrest apparatus according to embodiments of the present disclosure.

FIG. 5 illustrates a cross sectional view of a headrest apparatus 500 with a rotation mechanism 560 according to embodiments of the present disclosure. The rotation mechanism 560 may include a link and track. Specifically, the headrest 501 may be coupled to a link 561. The link 561 may be attached to a frame of the headrest 501 or otherwise secured relative to headrest 501. The link 561 may be configured to move in a curved track 562. The curved track may be located in a coupling block attached to a top of at least one of the one or more rods 520. As described with respect to the rotation mechanisms above, in some embodiments, a single link and track mechanism may be located in a coupling block disposed between the one or more rods 520. In some embodiments, there may be more than one link 561 and track 562 located in the coupling block 564 or more than one link 561 and track 562 mechanism may be included in the coupling block 564.

The track 562 may include a plurality of pawls 563. In some embodiments, there may be a pair of pawls instead of a single pawl. Each pawl 563 corresponds to a position of the headrest 501. For example, the leftmost pawl may correspond to a first position of the headrest 501. In some embodiments, the track 562 can include a spring 565. In some embodiments, the spring 565 is located posterior to the link 561. For example, as a force is applied to the headrest 501 and pushes the link 561 to a more posterior position, the spring 565 will be compressed as the link traverses between positions. When the pawls 563 are released, the spring 565 may return the link to a more anterior position. In some embodiments, the spring can be located anterior to the link 561. For example, a force applied to the headrest 501 may cause the spring to elongate as the link 561 traverses between positions. When the pawls 563 are released, the spring may pull the link to a more anterior position. Thus, the spring can moderate the amount of force required to move the link 561 along the track 562 to a more posterior position.

One skilled in the art will understand that in some embodiments, the rotational movement and amount of force to move the headrest to a more posterior position may be determined based on the type of rotation mechanism and the specific geometry of the rotation mechanism. For example, the spring constant of the spring disposed in the rotation mechanism may determine the amount of force required to rotate the headrest. One skilled in the art will understand that various rotation mechanisms may be used without departing from the scope of this disclosure. Moreover, the apparatus is not limited to the types of rotation mechanisms described above.

FIGS. 6A-6D illustrate various positions of the headrest apparatus 600 according to embodiments of the present disclosure. The headrest 601 rotates about an axis of rotation 640. In some embodiments, the axis of rotation 640 of the headrest 601 is located in a direction forward and below a center of mass 642 of the headrest 601. According to some embodiments, the center of mass 642 may be the same as the center of volume of the headrest 601. In some embodiments, the axis of rotation 640 is located at a position outside the body of headrest 601. As shown in FIGS. 6A-6D, the axis of rotation is located both outside the body of headrest 601 as well as forward and below a center of mass 642 of the headrest 601. This location of the axis of rotation may enable the headrest to support and maintain contact with the neck and back of the head during a sudden stop or collision without putting additional stress or strain on the occupant.

The angle of the headrest 601 relative to the x-axis 650 is indicated with line 652. In some embodiments, the angle of rotation of the headrest 601 may be approximately 15 degrees. In some embodiments, the angle of rotation may be 1 degree to 40 degrees. Although headrest 601 is illustrated as being rotatable between four positions in FIGS. 6A-6D, one skilled in the art will understand that headrest 601 may be configured to rotate between any number of positions. For example, in some embodiments, the headrest may be configured to rotate between five positions. In other embodiments, the headrest may be configured to rotate between greater than or less than five positions. One skilled in the art will understand the FIGS. 6A-6D are provided for illustrative purposes and may not be to scale.

Figure 6A:
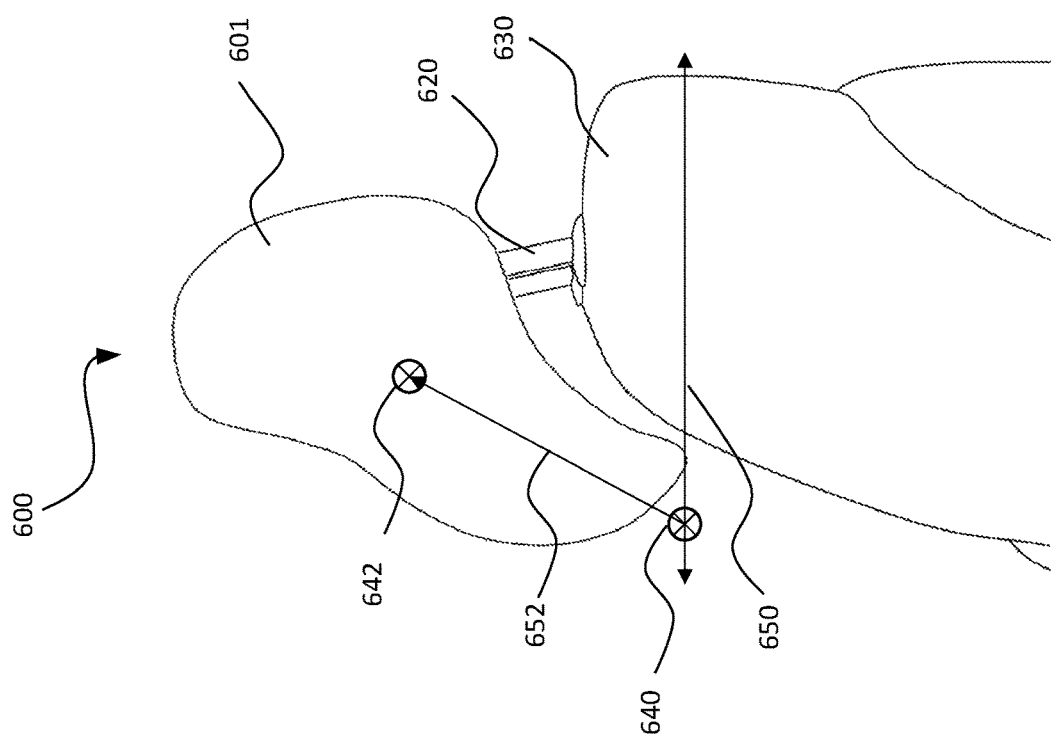
Figure 6D:
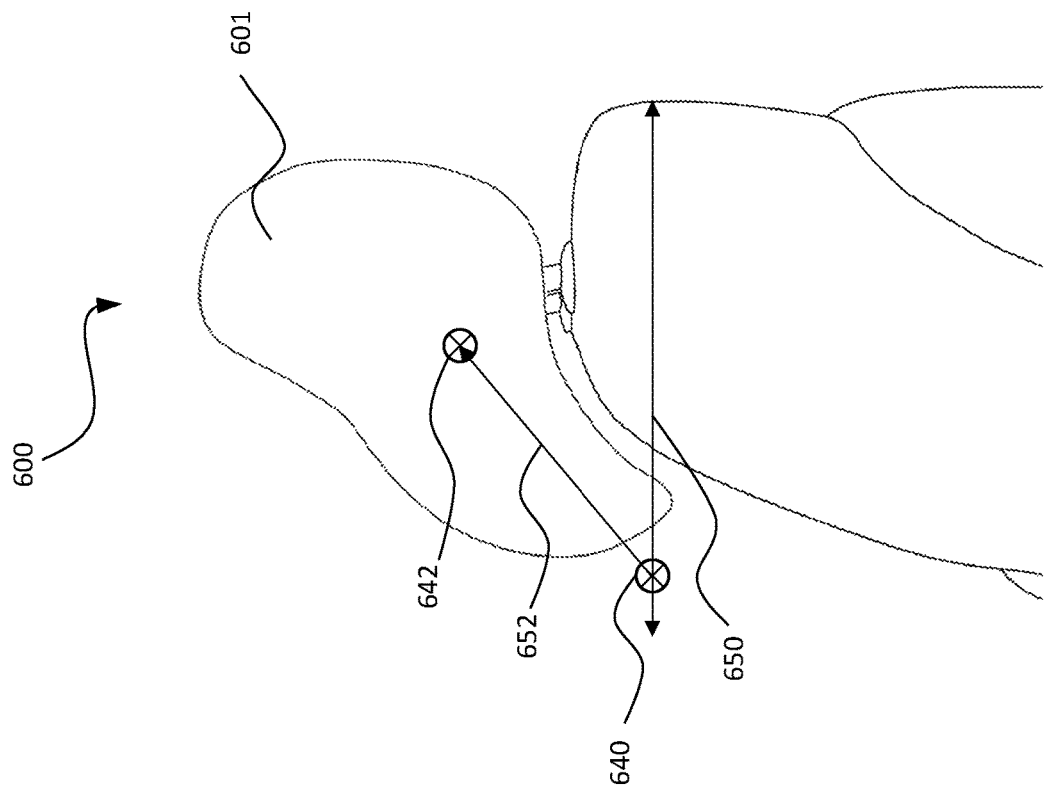
Figure 6C:
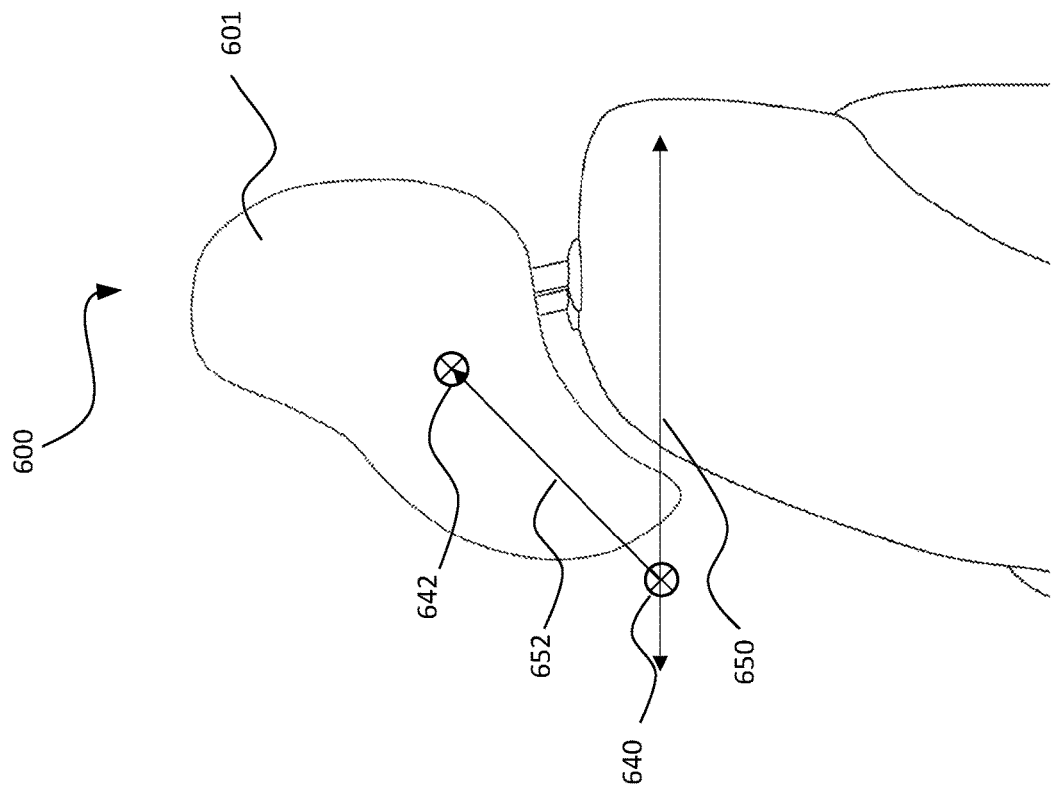

FIGS. 6A, 6C, and 6D are side views of the headrest 601 of apparatus 600 in non-neutral positions in accordance with embodiments of the present disclosure. As shown in FIG. 6C, the headrest is rotated in a clockwise direction from the neutral position of 6B to a first posterior position. Application of force to the headrest, e.g., the front face of the headrest 601, may cause the headrest 601 to rotate in a clockwise direction to a relatively posterior position. Application of additional force for a period of time may cause the headrest 601 to rotate farther to a second posterior position, as shown in FIG. 6D. In some embodiments, the headrest can be configurable to be in a position anterior to the neutral position as seen in FIG. 6A.

Figure 7:
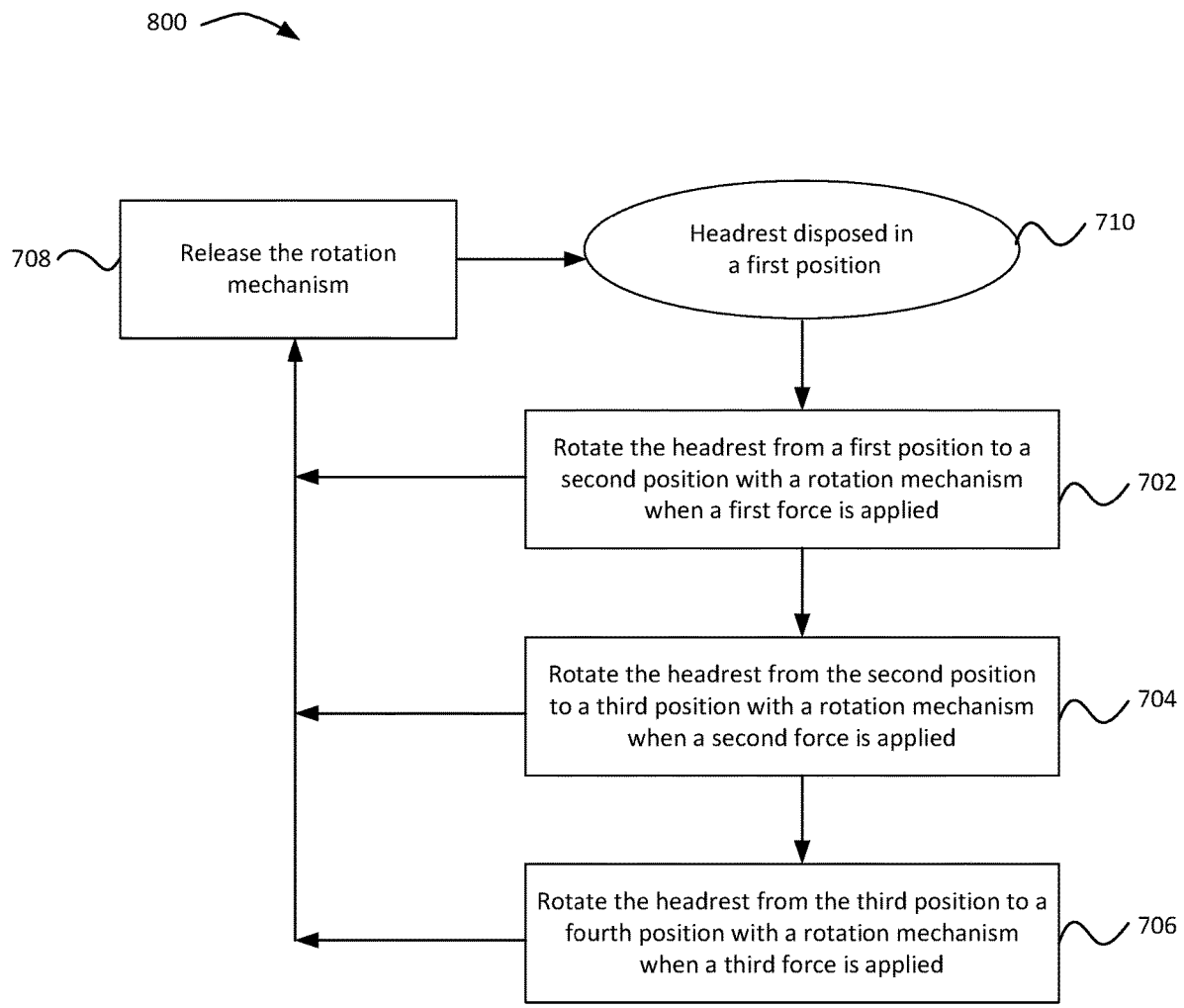
FIG. 7 is a flow chart of a method of using a headrest apparatus in accordance with embodiments of the present disclosure.

FIG. 7 is a flowchart of a method of operation of the headrest in accordance with embodiments of the present disclosure. In some embodiments, the first position may be a neutral position. The neutral position of the headrest apparatus corresponds to a normal curvature of a human spine, e.g., FIG. 1. With the headrest in a neutral position, the back of the neck and head of the occupant may be in contact with the headrest. In this manner, the headrest may provide head and neck support to the occupant while the occupant is seated. With the head and neck supported, the headrest may alleviate head and neck pain associated with long drives.

The headrest may rotate from a first position to a second position with a rotation mechanism, when a first force is applied to the headrest for a period of time 702. The second position may be a located posterior to the first position. One skilled in the art will understand that in some examples, the second position may not be directly posterior to the first position. That is, a single force may move the headrest between more than one position. Specifically, movement from a first position to a second position may "skip" an adjacent posterior position depending on the amount of force applied and the duration of the application of the force. For example, if an occupant is involved in a rear-end collision, the first position may correspond to a neutral position, e.g., FIG. 6B, and the second position may correspond to a non-adjacent posterior position, e.g., FIG. 6D, such that an adjacent posterior position, e.g., FIG. 6C, may be skipped due to the large force and/or duration of impact. Movement of the headrest with the head as a result of a rear-end collision allows some of the energy of the collision to be absorbed by the headrest.

In some embodiments, the period of time to move the headrest from the first position to a second position may depend on the amount of force applied. For example, it may take less time to move the headrest from a first position to a second position for a larger force than a smaller force. That is, the amount of time required to move the headrest from a first position to a second position may be shorter for a force with a larger magnitude.

The first force may be applied, for example, with the back of the occupant's head or neck. The headrest may remain in the second position even when the first force is no longer being applied. In some embodiments, a user may use the back of the head to apply force to the headrest and move the headrest from a first position to a second position (e.g., step 702). For example, if a user is involved in a rear-end collision, the force from the impact may push the occupant's head against the headrest. The force exerted on the headrest may cause the rotation mechanism to index and rotate the headrest from a first position to a second position. In some embodiments, the second position may be a non-adjacent posterior position. In this manner energy from the collision will be absorbed by the headrest and may reduce the injuries of the occupant.

In some instances, a user may apply force to the headrest with a hand or body part other than the head to move the headrest from the first position to a second position. For example, if a user is wearing a hat or a hairstyle that may interfere with the seated neutral position, the user may use a hand to push the headrest back to a more posterior position so that the hat or hairdo is no longer uncomfortably resting against the headrest. Even when the headrest is pushed back to a more posterior position, at least a portion of the occupant's head or neck may maintain contact with the headrest. The headrest may remain in the second position until application of a second force or the button is pressed.

A second force may be applied to the headrest for a period of time to rotate the headrest from a second position to third position 704. In some embodiments, the force required to move the headrest from the second position to the third position may be greater than the force required to move the headrest from the first position to the second position. In some embodiments, the period of time to move the headrest from the second position to the third position may be greater than the period of time to move the headrest from the first position to the second position. In some embodiments, the period of time to move the headrest from the second position to the third position may depend on the amount of force applied.

As discussed above, in some examples, the third position may not be directly posterior to the second position. That is, movement from a second position to a third position may "skip" an adjacent posterior position depending on the amount of force applied and the duration of the application of the force. The headrest may remain in the third position even when the second force is no longer being applied. That is, the headrest will remain in the third position until application of a third force or the button is pressed.

If a third force is applied to the headrest for an amount of time, the headrest may rotate from the third position to a fourth position 706. If the button is pressed, the rotation mechanism will release 708 and the headrest may return to the first position, 710. Although the FIG. 7 shows the headrest returning to the first position, one skilled in the art will understand that the headrest may return to any position anterior to the third position, e.g., the second or first position. In some embodiments, the neutral position is the first position and most anterior position. Although FIG. 7 shows the headrest having four positions, one skilled in the art will understand that the headrest may be configurable for any number of positions.

Figure 8:
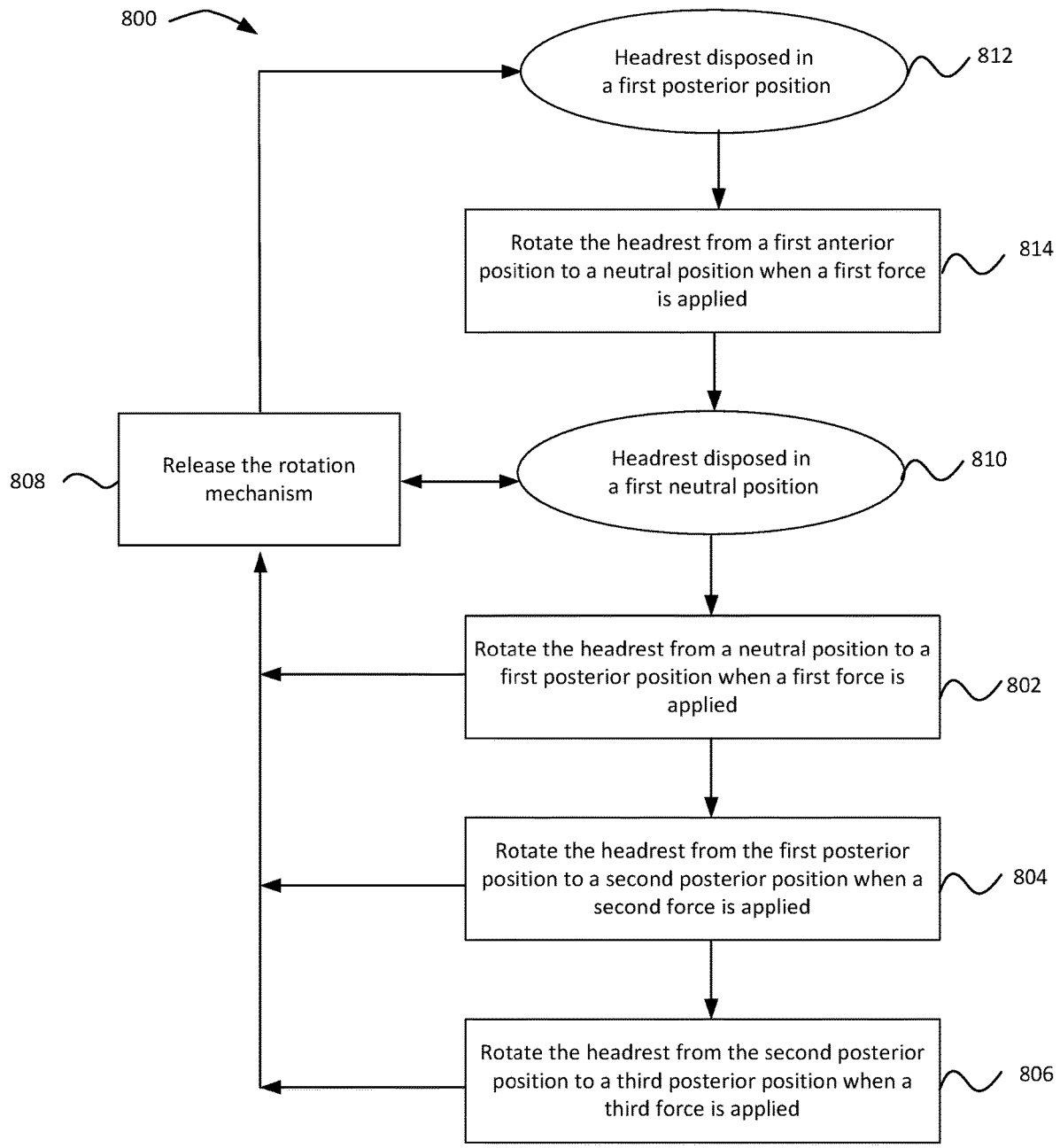
FIG. 8 is a flow chart of a method of using a headrest apparatus in accordance with embodiments of the present disclosure.

FIG. 8 is a flowchart of a method of operation of the headrest in according to embodiments of the present disclosure. In some embodiments, a headrest apparatus may be configured so that the neutral position of the headrest does not correspond to the most anterior position. For example, as shown in FIG. 8, the headrest may be provided in a first anterior position 812. One skilled in the art will understand that the headrest may be in an initial position that corresponds to any position of the headrest, for example, the neutral position 810.

To rotate the headrest from the first anterior position to the first position, a first force may be applied by the user to the headrest for a first duration 814. A user may do so with a head, hand, or another part of the body. The headrest may be rotated from the neutral position 810 to a first posterior position 802, second posterior position 804, and a third posterior position 805 as described with respect to FIG. 7. The headrest may be returned to the neutral position or any relatively anterior position by releasing the rotation mechanism 808, for example by pressing a button located on the headrest. In this manner, motion of the headrest to a more posterior position may be achieved by applying a force, while motion of the headrest to a more anterior position may be achieved by releasing the rotation mechanism with the button.

Although examples of this disclosure have been fully described with reference to the accompanying drawings, it is to be noted that various changes and modifications will become apparent to those skilled in the art. In some embodiments, the size and profile of the headrest may be different for men, women, and children. For example, the size and profile of the headrest could be designed to accommodate the smaller head size and body structure of a child. Such changes and modifications are to be understood as being included within the scope of examples of this disclosure as defined by the appended claims.

The invention claimed is:

1. An apparatus comprising:
    a headrest comprising:
        a front face, wherein in a first position a profile of the front face conforms to a normal cervical spine curvature of an occupant in a seated position;
        a rear face opposite the front face;
        a bottom face disposed between a lower portion of the front face and a lower portion of the rear face;
        a first side face disposed between the forward-facing surface and the rear facing surface; and
        a second side face disposed between the forward-facing surface and the rear facing surface opposite the first side face;
    one or more rods extending from the bottom face of the headrest; and
    a rotation mechanism coupled between the headrest and the one or more rods, the rotation mechanism comprising a plurality of stops, each stop corresponding to a discrete rotational position of the headrest,
    wherein the rotation mechanism is configured to:
        rotate the headrest from a first stop of the plurality of stops, corresponding to the first position, to at least a second stop, corresponding to a second position, when the headrest receives a first force, and
        rotate the headrest from the second stop to a third stop, corresponding to a third position, when the headrest receives a second force,
        wherein the headrest is configured to rotate to the third stop upon receiving a collision force, and wherein the second force is a collision force.

2. The apparatus of claim 1, wherein the rotation mechanism remains in at least the second position once the first force is removed.

3. The apparatus of claim 1, further comprising a first button disposed on the first side surface, wherein the first button is configured to rotate the headrest from at least the second position to the first position.

4. The apparatus of claim 1, wherein an axis of rotation of the rotation mechanism is located in a direction forward and below a center of mass of the headrest.

5. The apparatus of claim 1,
    wherein an axis of rotation of the rotation mechanism is located at a location outside the headrest.

6. The apparatus of claim 1, wherein the second force is greater than the first force.

7. The apparatus of claim 2, wherein the headrest is configurable to be held in a plurality of positions depending on a force received at the headrest, wherein each of the plurality of positions is positioned at a different angle of rotation.

8. The apparatus of claim 1, wherein the front face is configured to contact a neck and a head of the occupant in the first position.

9. The apparatus of claim 1, further comprising a layer of cooling gel disposed beneath a surface of the headrest proximate the front face.

10. The apparatus of claim 1, further comprising a plurality of perforations disposed on a surface of the front face of the headrest.

11. The apparatus of claim 1, configured to be used with a car seat.

12. The apparatus of claim 1, wherein the rotation mechanism comprises five or more stops, each stop corresponding to a discrete rotational position of the headrest.

13. An apparatus comprising:
    a headrest comprising a front face, wherein in a first position a profile of the front face conforms to a normal cervical spine curvature of an occupant in a seated position;
    at least one rod extending from the headrest; and
    a rotation mechanism coupled between the headrest and the one or more rods, the rotation mechanism comprising a plurality of stops, each stop corresponding to a discrete rotational position of the headrest,
    wherein the rotation mechanism is configured to:
        rotate the headrest from a first stop of the plurality of stops, corresponding to the first position, to at least a second stop, corresponding to a second position, when the headrest receives a first force, and
        rotate the headrest from the second stop to a third stop, corresponding to a third position, when the headrest receives a second force, wherein the headrest is configured to rotate to the third stop upon receiving a collision force, and wherein the second force is a collision force.

* * * * *